US007581633B2

(12) United States Patent
Stueckle

(10) Patent No.: US 7,581,633 B2
(45) Date of Patent: Sep. 1, 2009

(54) METHOD AND APPARATUS FOR ORIENTING ARTICLES

(76) Inventor: Dieter Stueckle, 1565 Forest Grove Rd., Forest Grove, PA (US) 18922

( * ) Notice: Subject to any disclaimer, the term of this patent is extended or adjusted under 35 U.S.C. 154(b) by 233 days.

(21) Appl. No.: 11/717,478

(22) Filed: Mar. 13, 2007

(65) Prior Publication Data

US 2007/0246327 A1 Oct. 25, 2007

Related U.S. Application Data

(60) Provisional application No. 60/781,677, filed on Mar. 13, 2006.

(51) Int. Cl.
*B65G 47/84* (2006.01)

(52) U.S. Cl. ............................ 198/397.04; 198/397.05; 198/383

(58) Field of Classification Search ................. 198/383, 198/390, 392, 410, 412, 471.1, 478.1, 397.04, 198/397.05
See application file for complete search history.

(56) References Cited

U.S. PATENT DOCUMENTS

| | | | | |
|---|---|---|---|---|
| 3,931,884 | A * | 1/1976 | Ackley | 198/380 |
| 4,104,966 | A * | 8/1978 | Ackley et al. | 198/393 |
| 4,353,456 | A * | 10/1982 | Yamamoto | 198/397.04 |
| 4,479,573 | A * | 10/1984 | Ackley et al. | 198/397.04 |
| 6,481,347 | B2 * | 11/2002 | Ackley | 101/38.1 |

* cited by examiner

*Primary Examiner*—James R Bidwell
(74) *Attorney, Agent, or Firm*—RatnerPrestia

(57) ABSTRACT

An apparatus for orienting a pill. The apparatus has a curved member having a point of tangency at which the pill is positioned on the curved member and a portion for positioning the pill skewed from a tangent at the point of tangency.

13 Claims, 15 Drawing Sheets

METHOD AND APPARATUS FOR ORIENTING ARTICLES

This application is a non-provisional which claims priority based on 60/781,677 filed Mar. 13, 2006, which is incorporated by reference.

FIELD OF THE INVENTION

The present invention is directed to an apparatus for orienting articles, and more particularly, to an apparatus for orienting pills or capsules so as to permit them to be visually inspected.

BACKGROUND OF THE INVENTION

Small articles, such as pharmaceutical pills or capsules, must be inspected after the manufacturing process has been completed and before they are packaged for sale. Pharmaceutical pills and capsules are produced and packaged rapidly in large quantities and therefore must be inspected rapidly. Among other types of inspections, each pill or capsule must be inspected for structural integrity to ensure that it is shaped correctly and does not have any missing parts, cracks, or holes.

Each pill or capsule has a plurality of surfaces that must be inspected. A round pill, for example, has a continuous circumferential surface that must be inspected. A pill with a rectangular-type shape has at least four sides and two ends that must be inspected. If any of the sides are beveled, the beveled surfaces must also be inspected.

SUMMARY OF THE INVENTION

An apparatus and a method provide for orienting pills. According to an exemplary embodiment, the apparatus has a curved member having a point of tangency at which the pill is positioned on the curved member. A portion of the curved member has a portion for positioning the pill such that the pill is skewed from a tangent of the curved member at the point of tangency at the point of tangency.

According to another exemplary embodiment, an orienting apparatus has a first curved member and a second curved member positioned adjacent the first curved member. The first curved member has a first point of tangency at which the pill is positioned on the first curved member and a portion for positioning the pill skewed from a first tangent of the first curved member at the first point of tangency. The second curved member has a second point of tangency at which the pill is adapted to be positioned on the second curved member and a second portion for positioning the pill skewed from a second tangent of the second curved member at the second point of tangency.

A method is also contemplated for orienting a pill in a first curved member and in a second curved member. The first curved member has a first point of tangency at which the pill is positioned and a first portion for positioning the pill skewed from a first tangent of the first curved member at the first point of tangency. The second curved member has a second point of tangency at which the pill is positioned on the second curved member and a second portion for positioning the pill skewed from a second tangent of the second curved member at the second point of tangency. The exemplary embodiment of the method comprises positioning the pill at the first point of tangency skewed from the first tangent and transferring the pill to the second curved member skewed from the second tangent.

BRIEF DESCRIPTION OF THE DRAWINGS

The invention is best understood from the following detailed description when read in connect with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
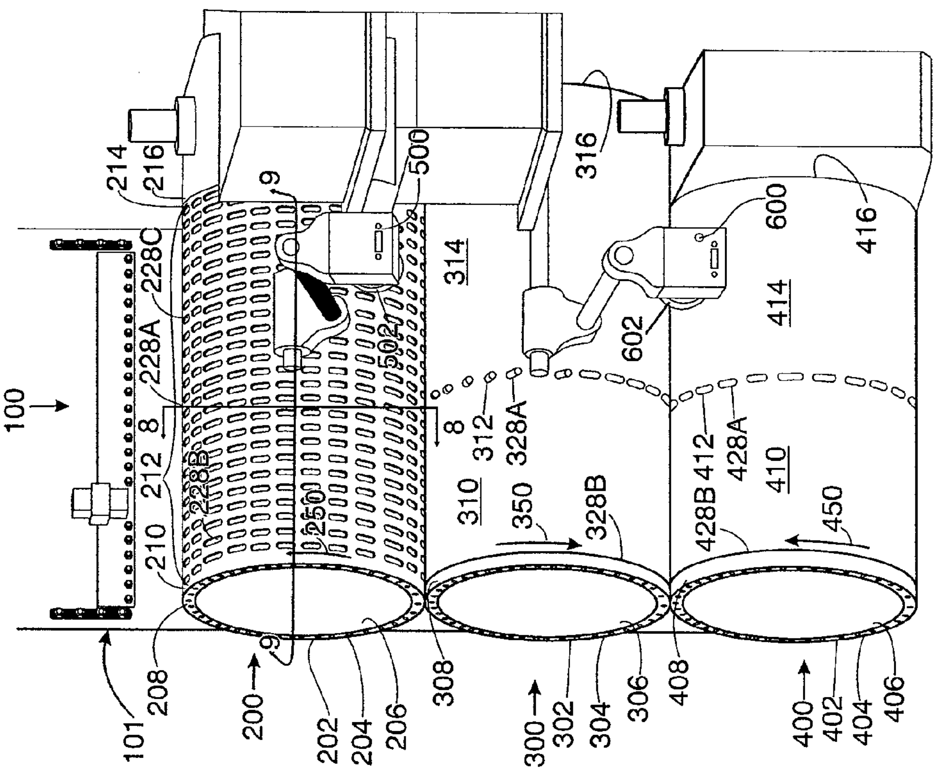
FIG. 1 is a perspective drawing of a system for orienting pills for inspecting pills in accordance with an exemplary embodiment of the present invention.
Figure 2:
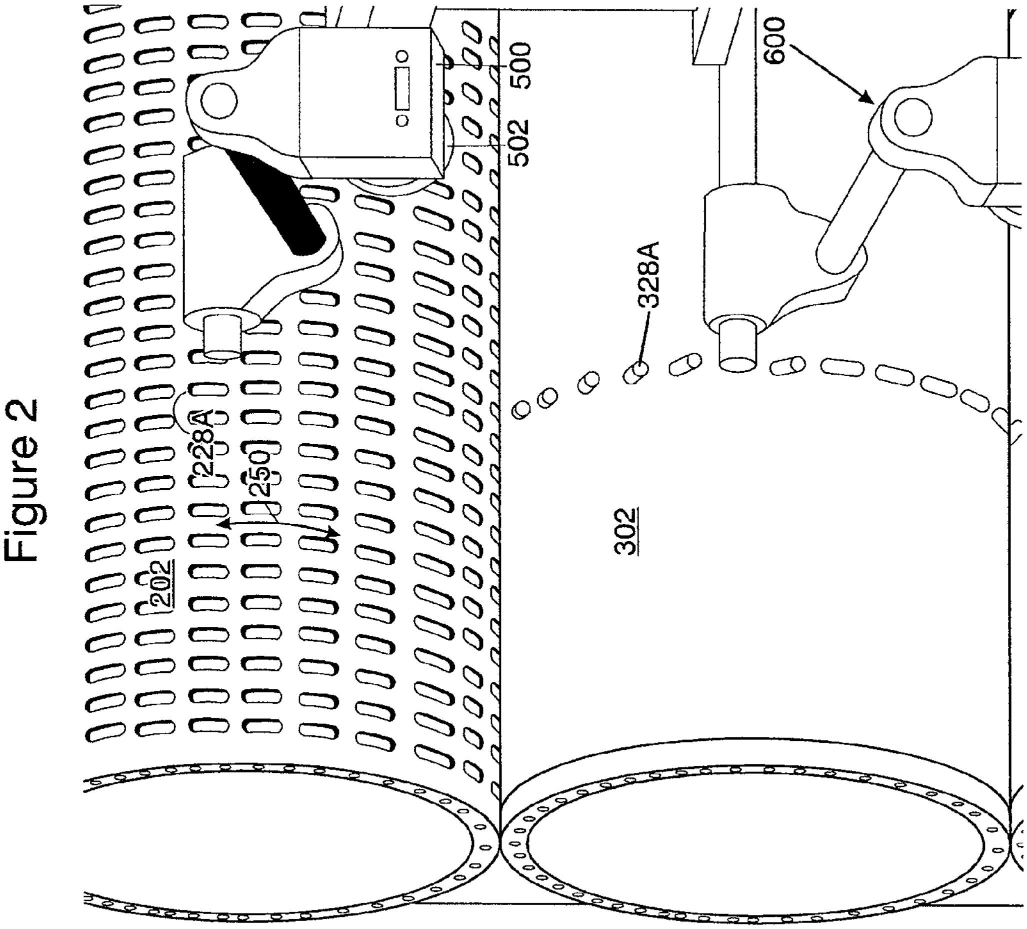
FIG. 2 is an enlarged perspective drawing of a portion of the system illustrated in FIG. 1.
Figure 3:
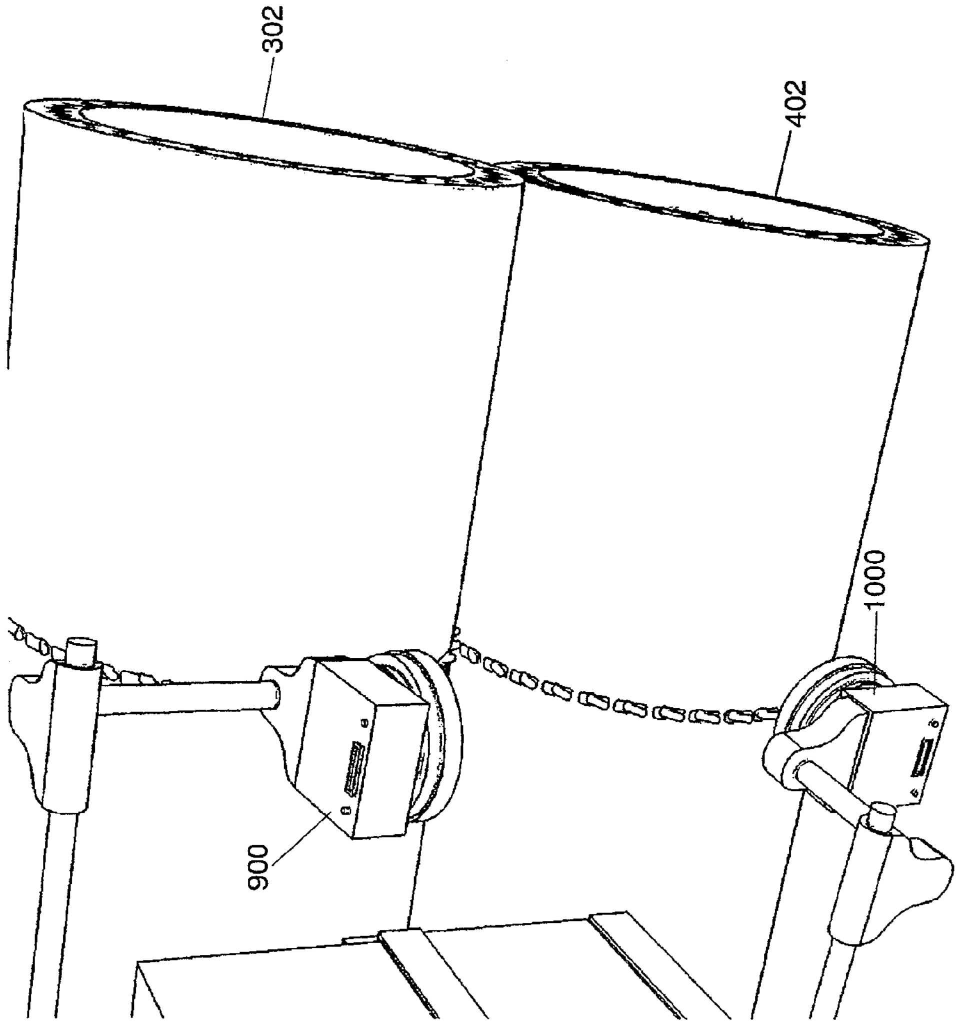
FIG. 3 is an enlarged perspective drawing of another portion of the system illustrated in FIG. 1.

Referring now to the drawing, in which like reference numbers refer to like elements throughout the various figures that comprise the drawing, FIG. 1 illustrates a perspective drawing of an exemplary embodiment of a system 100 for orienting pills so they can be visually inspected. As shown in the exemplary embodiment illustrated in FIG. 1, system 100 may include a curved member 200, a curved member 300, a curved member 400, a first camera assembly 500, and a second camera assembly 600. In an exemplary embodiment of the invention, curved members 200, 300 and 400 may include hollow cylindrical wheels 202, 302, and 402. In an alternative embodiment, one or more of the curved members 200, 300, and 400 may not comprise a complete cylindrical wheel; but may, instead, form an arc that is less than 360°.

In an exemplary embodiment, cylindrical wheels 202, 302, and 402 may each be continuously rotatable about a 360° arc. In an alternative embodiment, one or more of the wheels 202, 302, and 402 may be rotatable about an arc that is less than 360°. In an alternative embodiment where curved members 200, 300, and 400 form an arc that is less than 360°, those curved members may rotate through an arc that is either 360° or in an arc that is less than 360°.

Wheels 202, 302, and 402 each may be coupled to one or more attachment structures (not shown) for attaching each of them to one or more sources of motion. In an exemplary embodiment, wheel 202 may be coupled to a first attachment structure (not shown), wheel 302 may be coupled to a second attachment structure, and wheel 402 may be coupled to a third attachment structure. In an alternative embodiment, wheels

202, 302, and 402 may all be attached to a single attachment structure. In another alternative embodiment, only two of the wheels 202, 302, 402 may be attached to a single attachment structure and the remaining wheel may be attached to a second attachment structure.

In an exemplary embodiment, the first, second, and third attachment structures may be coupled, respectively, to first, second, and third sources of motion (not shown). More specifically, the first attachment structure may be coupled to the first source of motion; the second attachment structure may be coupled to the second source of motion; and the third attachment structure may be coupled to the third source of motion. In an alternative embodiment, the first, second, and third attachment structures may all be coupled to one source of motion. In another alternative embodiment, only two of the attachment structures may be coupled to a single source of motion and the remaining attachment structure may be coupled to a second source of motion.

In an exemplary embodiment, any one, or all, of the one or more sources of motion may comprise one or more motors (not shown) coupled by one or more sets of gearing (not shown), to the one or more attachment structures. The sources of motion may be able to cause rotation of the wheels at a single speed or at varying speeds.

Wheels 202, 302, and 402 may rotate either in a clockwise direction or a counterclockwise direction. In an exemplary embodiment, wheel 202 may rotate in a counterclockwise direction, wheel 302 may rotate in a clockwise direction, and wheel 402 may rotate in a counterclockwise direction. In an alternative embodiment, wheel 202 may rotate in a clockwise direction, wheel 302 may rotate in a counterclockwise direction, and wheel 402 may rotate in a clockwise direction. In yet another alternative embodiment, all of the wheels may rotate in a clockwise direction or may all rotate in a counterclockwise direction. In yet another alternative embodiment, the direction of rotation of each wheel may be selected based upon space requirements and equipment availability or other factors that cannot be anticipated at the present time.

In an exemplary embodiment, wheels 202, 302, and 402 may all rotate at the same rate; i.e., 24 revolutions per minute. In an alternative embodiment, the wheels may rotate a different number of revolutions per minute depending upon pill size, pill shape, equipment availability and other factors. In yet another alternative embodiment, the wheels may rotate at the rate of 144 degrees per second.

Wheel 202 has a first end 204 and a second end 216; wheel 302 has a first end 304 and a second end 316; and wheel 402 has a first end 404 and a second end 416. Wheel 202 has an inside wall 206 and an outside wall 208. Inside wall 206 traverses the entire length of wheel 202. Outside wall 208 may comprise a plurality of sections. A first section 210 of outside wall 208 may comprise a section that is not interrupted by apertures or slots. A second section 212 of outside wall 208 may comprise a plurality of apertures or slots to be described in detail below. A third section 214 of outside wall 208 may comprise another section that is not interrupted by slots.

Figure 6:
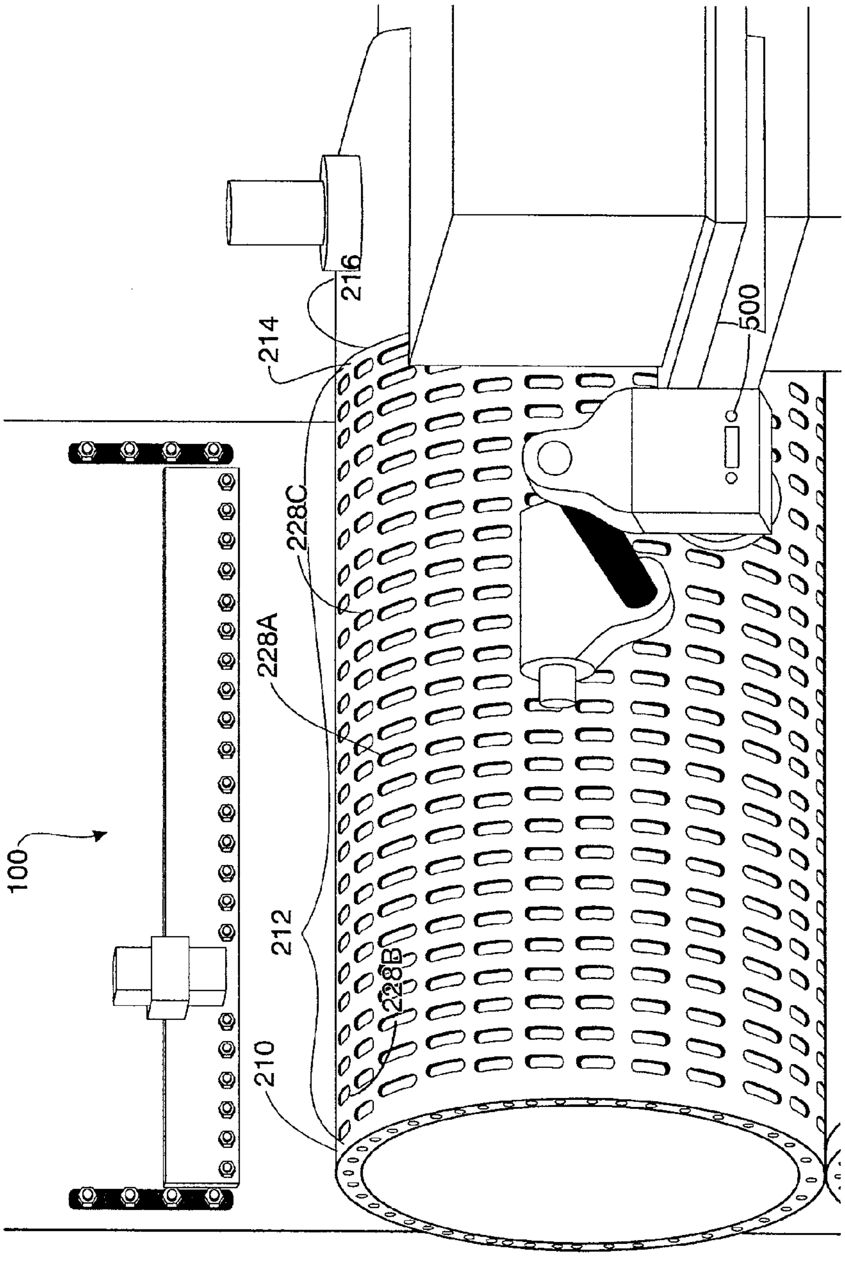
FIG. 6 is a further perspective view of a portion of the system illustrated in FIG. 2.

Referring to FIGS. 1 and 6, an exemplary embodiment of section 212 of outside wall 208 may have a plurality of apertures or slots formed within the surface of the outside wall. Each of the slots may be operable to receive respective pills. In an exemplary embodiment, a single slot may receive only a single pill. In an alternative embodiment, a single slot may receive more than one pill. The plurality of slots may be arranged in a plurality of circumferential rows distributed around outside wall 208. For example, one of the plurality of circumferential rows is identified by reference number 228A. Other exemplary circumferential rows are identified by reference numbers 228B and 228C. It can be seen, however, that an exemplary embodiment of outside wall 208 may include many more circumferential rows of slots. In an exemplary embodiment, each slot in a particular circumferential row may have the same shape and each slot in all of the circumferential rows may also have the same shape. In an alternative embodiment, slots in different circumferential rows may have shapes that are different from slots in other circumferential rows. For example, the shape of slots in row 228A may be the same or different that the shape of slots in rows 228B and 228C. If the shape of the slots are different, slots in different rows may be able to process pills that have different shapes or sizes.

Figure 4:
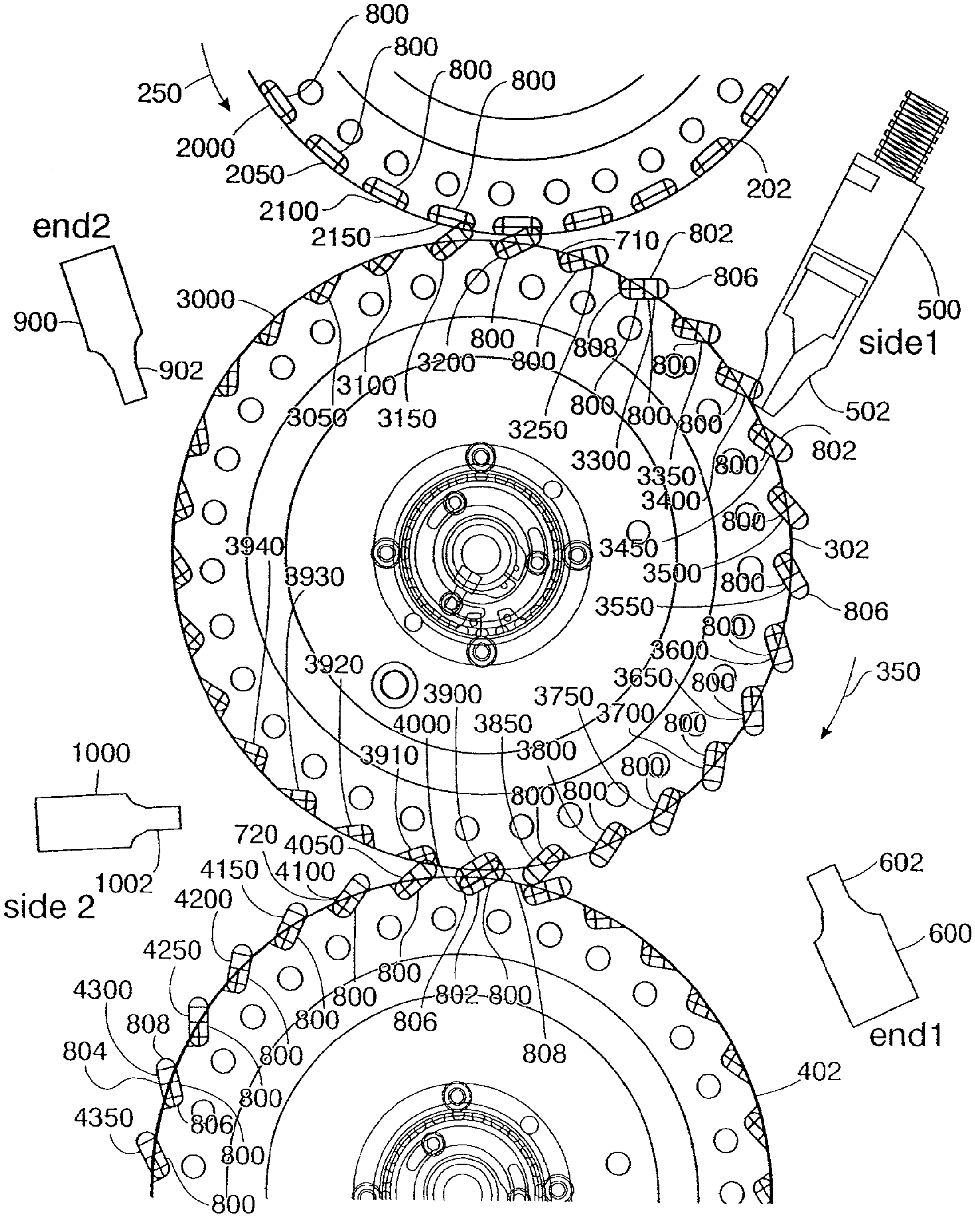
FIG. 4 is a plan drawing illustrating additional detail of the system illustrated in FIG. 1.
Figure 4A:
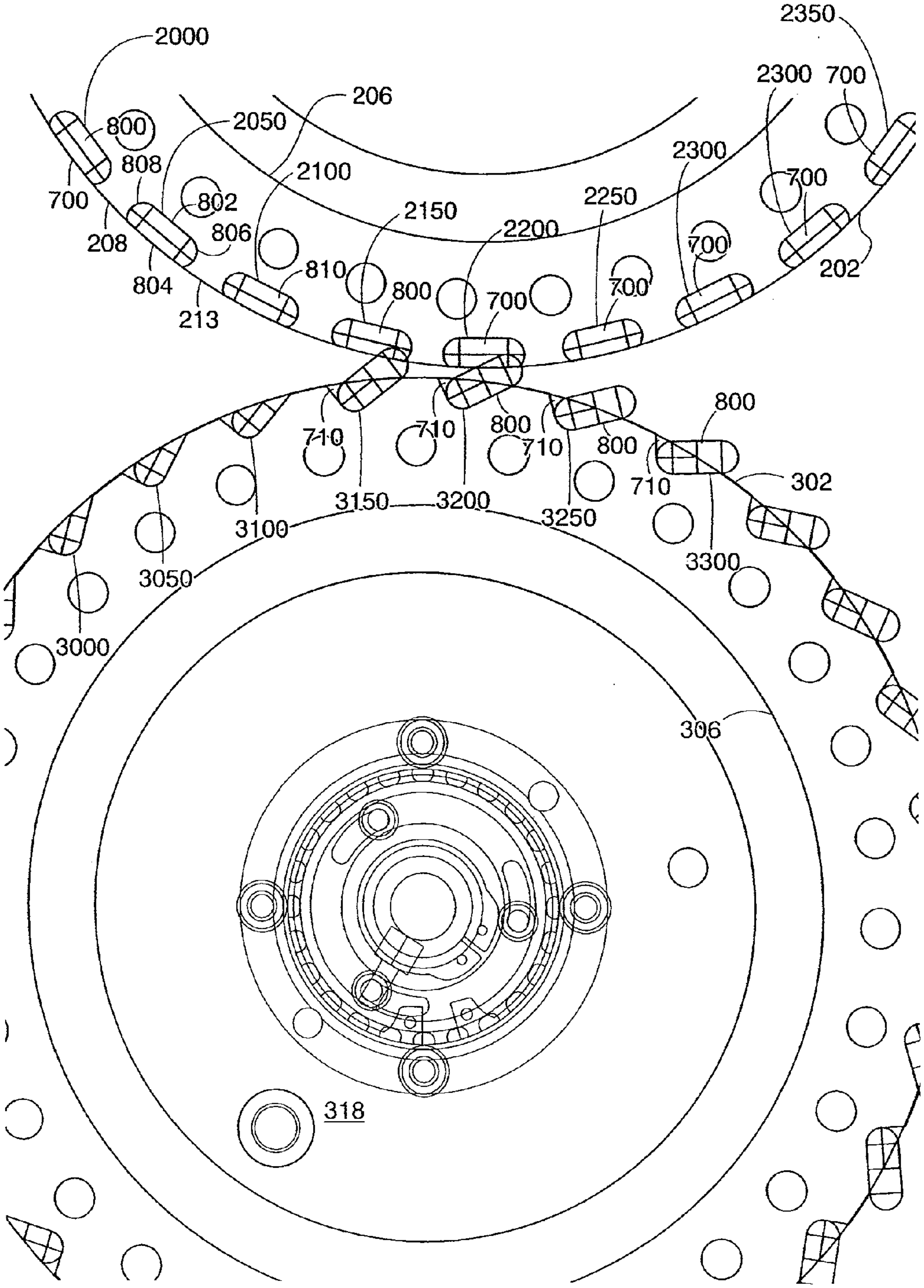
FIGS. 4A, 4B and 4C are plan drawings illustrating the orientation of pills in the system illustrated in FIG. 1.

FIG. 4 is a drawing illustrating an exemplary embodiment of a spaced relationship among wheels 202, 302, and 402 while looking at the ends 216, 316, and 416, respectively, of the wheels. FIG. 4 illustrates exemplary positions of one or more pills in an exemplary circumferential row in each wheel and illustrates an exemplary embodiment of how a pill or pills may be transferred from an exemplary row in wheel 202 to an exemplary row in wheel 302, and from the exemplary row in wheel 302 to an exemplary row in wheel 402. FIG. 4A is a drawing illustrating a closer view of the exemplary relationship between wheels 202 and 302.

Figure 5:
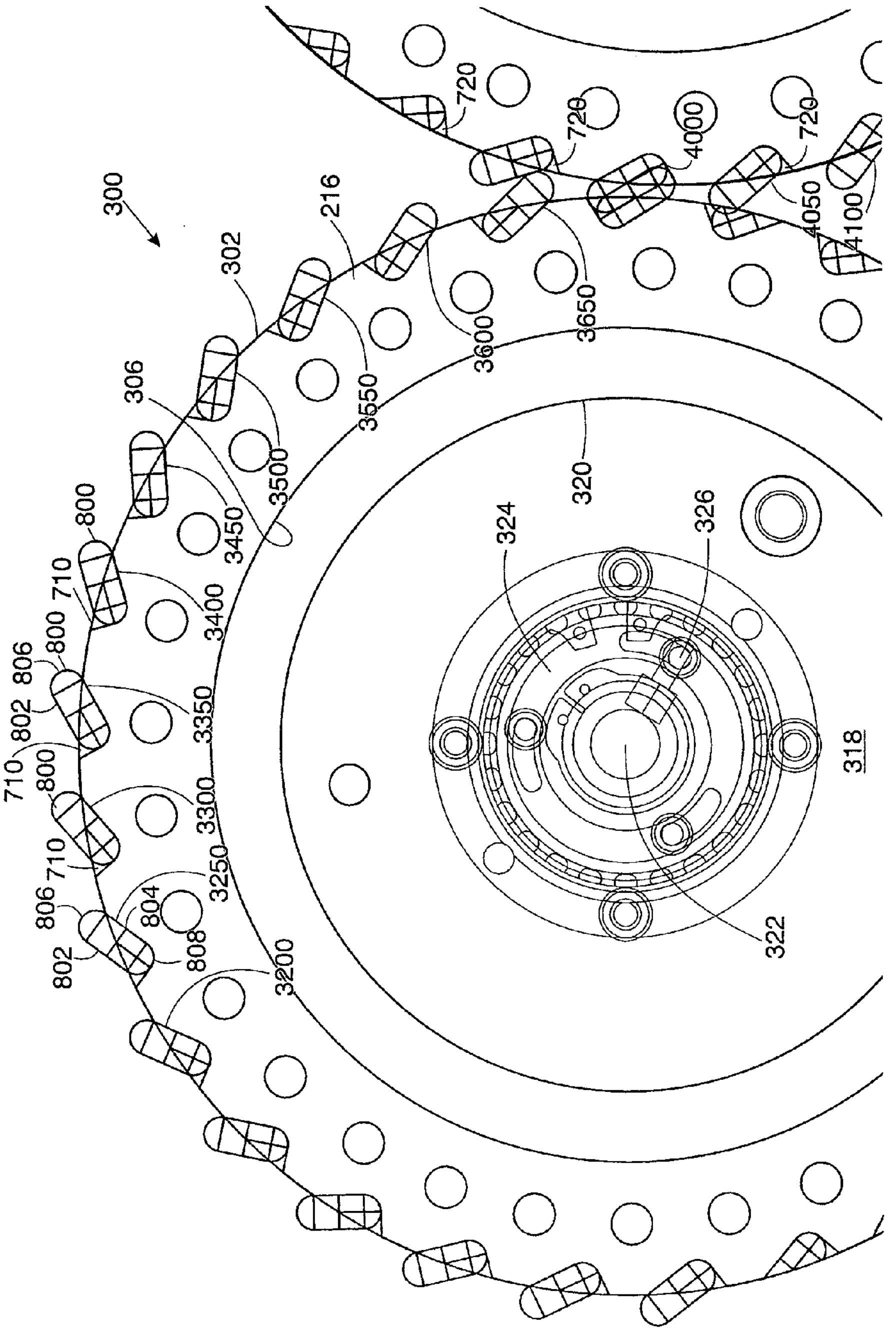
FIG. 5 is a plan drawing illustrating an end view of a wheel of the system illustrated in FIG. 1.

FIG. 5 is a drawing illustrating an exemplary embodiment of wheel 302 looking toward end 316. Referring to FIGS. 4A and 5, end 316 includes inside wall 306 and an attachment structure 318 for coupling a source of motion to wheel 302. In an exemplary embodiment, attachment structure 318 may include a rotatable hub 320 comprising an axle 322 coupled to an inside wheel 324 with bolts 326. Inside wheel 324 is, in turn, coupled to a shaft (not shown) and then to end 316 of wheel 302. In an alternative embodiment, a different attachment structure may be used and it may be coupled to wheel 302 in a different manner than is illustrated in FIG. 5. It will be understood by those skilled in the art, that an exemplary embodiment of wheels 202 and 402 may have the same attachment structure as the attachment structure illustrated in FIG. 5 or may have a different attachment structure.

Referring to FIGS. 1, 4, and 4A, when viewing wheel 202 while facing end 204, wheel 202 may be perceived as rotating in a counterclockwise direction, indicated by arrow 250. It will be understood that if wheel 202 were viewed while facing end 216, wheel 202 would appear to be rotating in a clockwise direction. When viewing wheel 302 while facing end 306, wheel 302 may be perceived as rotating in a clockwise direction as indicated by arrow 350. When viewing wheel 402 while facing end 404, wheel 402 may be perceived as rotating in a counterclockwise direction as indicated by arrow 450. If wheels 302 and 402 were viewed from ends 316 or 416, they would be perceived as rotating in an opposite direction.

Section 212 of wheel 202 may have an external surface 213. A thickness of section 212 is the distance between outside surface 213 and the inside surface of inside wall 206. In an exemplary embodiment, wheel 202 may be made from a strong material such as steel, hard plastic, or other hard material that may withstand the stress of constant movement and other stress inducing factors. Accordingly, these materials may constitute the material between external surface 213 and inside wall 206. A slot 700 (illustrated better in FIG. 4C) may be formed inside the material forming section 212.

Figure 4B:
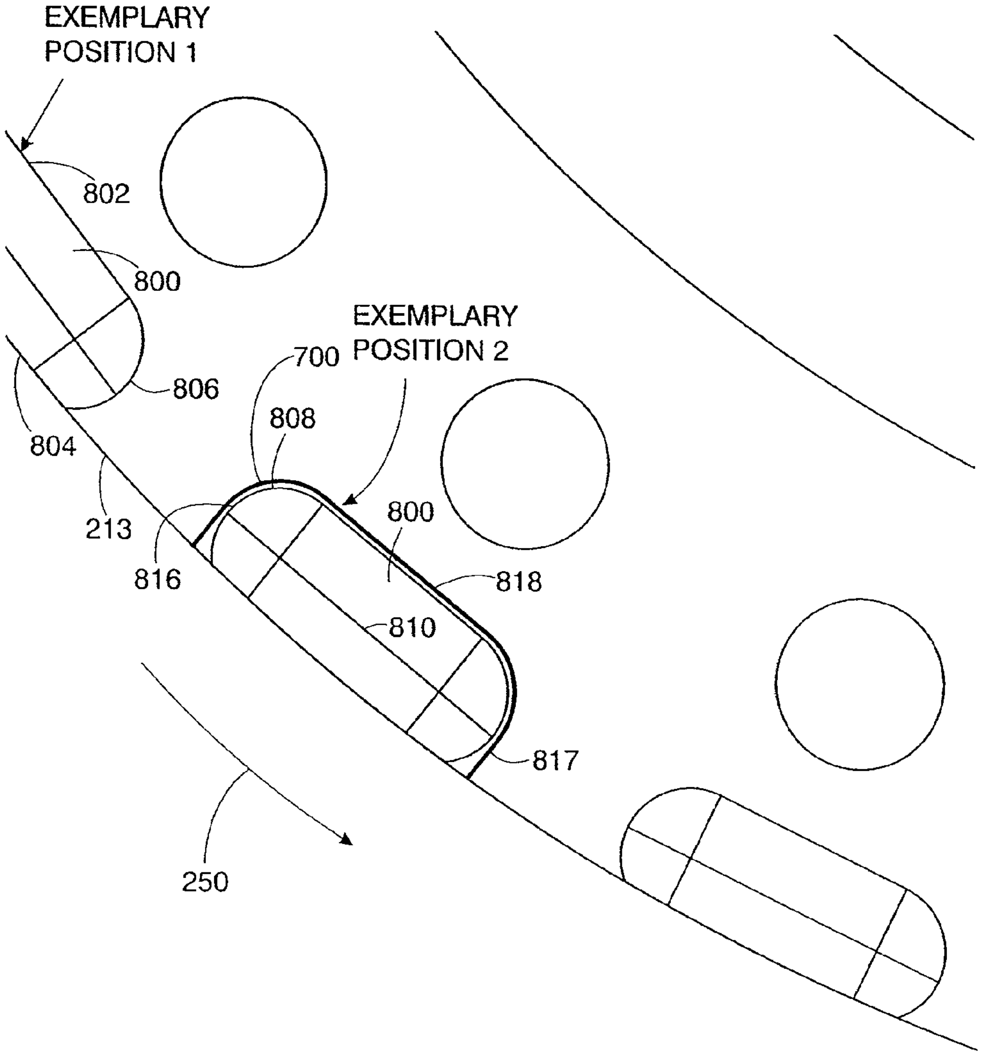
Figure 4C:
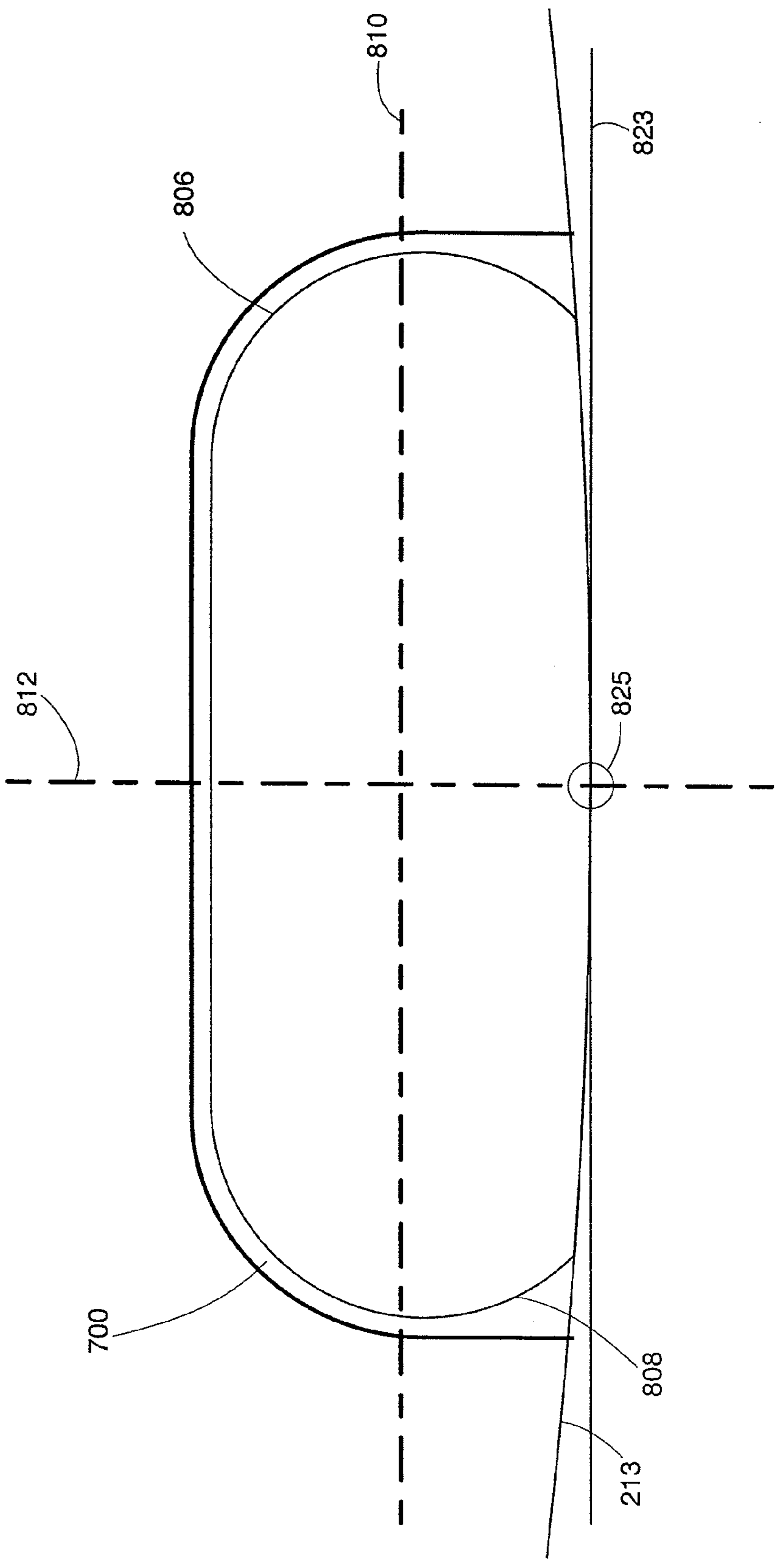

It is well known to one of ordinary skill in the art that a pill may exhibit any one of a plurality of shapes. For example, a pill may have a rectangular shape, an oval shape, or a round shape. In FIGS. 4A-4CB, a pill 800 is illustrated as having a generally rectangular shape with a first longitudinal side 802, a second longitudinal side 804, a first rounded end 806, and a second rounded end 808. Pill 800 may have a longitudinal axis 810. Referring to FIG. 4B, slot 700 may be formed by side walls 816, 817 and a top wall 818 coupling the two side walls. The depth of the two side walls 816, 817 and the length of the top wall 818 may be sufficient to enable slot 700 to receive a substantial portion of pill 800. In an alternative embodiment, the walls of slot 700 may be sufficiently to enable slot 700 to receive all of pill 800. In an exemplary embodiment, one or more of the walls of slot 700 may be formed of a mesh material. In an alternative embodiment, one or more of the walls may have one or more holes in them. In yet another embodiment, only one of the walls of slot 700 may have one or more holes in them.

An exemplary embodiment of the orientation of slot 700 relative to pill 800, and the outer surface 213 of wheel 202 will now be described with reference to FIG. 4C, which is an illustration of pill 800 in slot 700. FIG. 4C illustrates that pill 800 has a longitudinal axis 810. It also illustrates an axis 812 that is perpendicular to longitudinal axis 810 and is about midway between ends 806 and 808 of pill 800. Axis 812 intersects the plane formed by outer surface 213 at point 825. A line 823 may be drawn tangent to outer surface 213 at point 825. In an exemplary embodiment, slot 700 and pill 800 may be oriented in wheel 202 such that the longitudinal axis 810 of pill 800 is substantially parallel to tangent 823, thereby orienting pill 800 substantially parallel to tangent 823.

Referring back to FIG. 4B, arrow 250 indicates that wheel 202 is rotating in a counterclockwise direction. As wheel 202 rotates in a counterclockwise direction, pill 800 in slot 700 may also move sequentially, along with wheel 202, from Exemplary Position 1 to Exemplary Position 2. As wheel 202 and pill 800 rotate, pill 800 may maintain the same orientation with respect to tangent 823.

Referring back to FIG. 1, wheel 302 has an inside wall 306 and an outside wall 308. Inside wall 306 traverses the entire length of wheel 302. Outside wall 308 may comprise a series of sections. In one embodiment, a first section 310 may comprise a section that is not interrupted by slots. A second section 312 may comprise a plurality of slots to be described in detail below. A third section 314 may comprise another section that is not interrupted by slots.

In FIG. 1, an exemplary embodiment of section 312 of outside wall 308 is illustrated as having a plurality of apertures or slots formed within the outside wall. The plurality of slots are illustrated in FIG. 1 as arranged in a single circumferential row 328A along outside wall 308. In an alternative embodiment, section 312 may be similar to section 212 of wheel 202, having a plurality of circumferential rows of slots.

In such an alternative embodiment, the widths of sections 310 and 314 may be constructed in a manner that is smaller than the widths illustrated in FIG. 1. That is, the widths of sections 310 and 314 may be the same as the widths of sections 210 and 214 of wheel 202. Similarly, the width of an alternative embodiment of section 312 may be the same as the width of section 212 of wheel 202. In such an alternative embodiment, the number of circumferential rows of slots in section 312 may be the same as the number of circumferential rows of slots in section 212.

In an exemplary embodiment of wheel 302, each slot in circumferential row 328A may have the same shape. In the alternative embodiment of wheel 302 wherein there are a plurality of circumferential rows of slots, each slot in all of the circumferential rows may also have the same shape. In another alternative embodiment, slots in different circumferential rows may have shapes that are different from slots in other circumferential rows. If the shape of the slots are different, slots in different rows may be able to process pills that have different shapes or sizes. In an exemplary embodiment, a single slot may receive only a single pill.

Figure 5A:
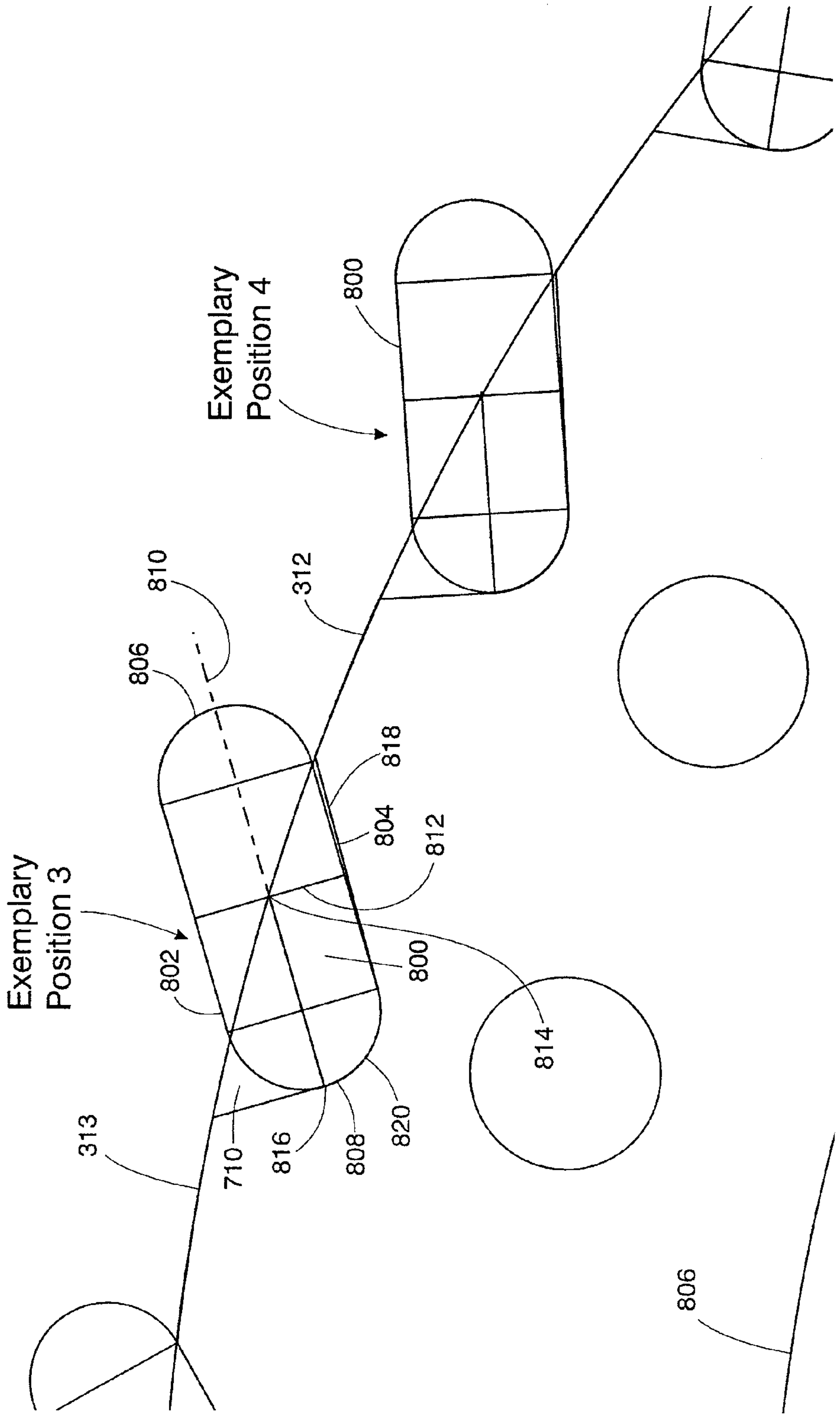
FIG. 5A is an enlarged drawing of a portion of the system illustrated in FIG. 5.

FIG. 5A illustrates an exemplary embodiment of a slot 710 in section 312 that is operable to receive pill 800. FIG. 5A illustrates slot 710 and pill 800 in two exemplary sequential positions. The first sequential position is identified as Exemplary Position 3 and the second sequential position is identified as Exemplary Position 4. In an exemplary embodiment, slot 710, with pill 800 inside slot 710, may move from Exemplary Position 3 to Exemplary Position 4 as wheel 302 rotates in a clockwise direction.

Section 312 of wheel 302 may have an external surface 313. A thickness of section 312 is the distance between surface 313 and the inside surface of inside wall 306. In an exemplary embodiment, wheel 302 may be made from a strong material such as steel, hard plastic, or other hard material that will withstand the stress of constant movement. Accordingly, these materials may constitute the material between external surface 313 and inside wall 306. Slot 710 may be formed inside the material forming section 312.

In FIG. 5A, pill 800 is illustrated as having generally a rectangular shape with a first longitudinal side 802, a second longitudinal side 804, a first rounded end 806, and a second rounded end 808. Pill 800 has a longitudinal axis 810 and an axis 812 across the width of the pill extending from side 802 to side 804 at approximately the middle of the longitudinal axis. Longitudinal axis 810 intersects axis 812 at point 814. Point 814 may coincide with the surface of 313 of wheel 302. Slot 710 may be formed by a side wall 816 and a longitudinal wall 818. Slot 710 may also include a curved portion 820 that couples back wall 816 to longitudinal wall 818. The radius of curved portion 820 may be the same as the radius of end 808 of pill 800. The depth of wall 816 and wall 818 into the material forming wheel 302 may be sufficient to enable slot 710 receive a substantial portion of pill 800. The remainder of pill 800 may protrude from slot 710 and beyond surface 313.

In an exemplary embodiment, side wall 816 and/or longitudinal wall 818 may be formed from a mesh material. In an alternative embodiment, side wall 816 and/or longitudinal wall 818 may each have one or more holes in them. In yet another alternative embodiment, only one of side wall 816 and longitudinal wall 818 may have one or more holes in them.

Figure 7:
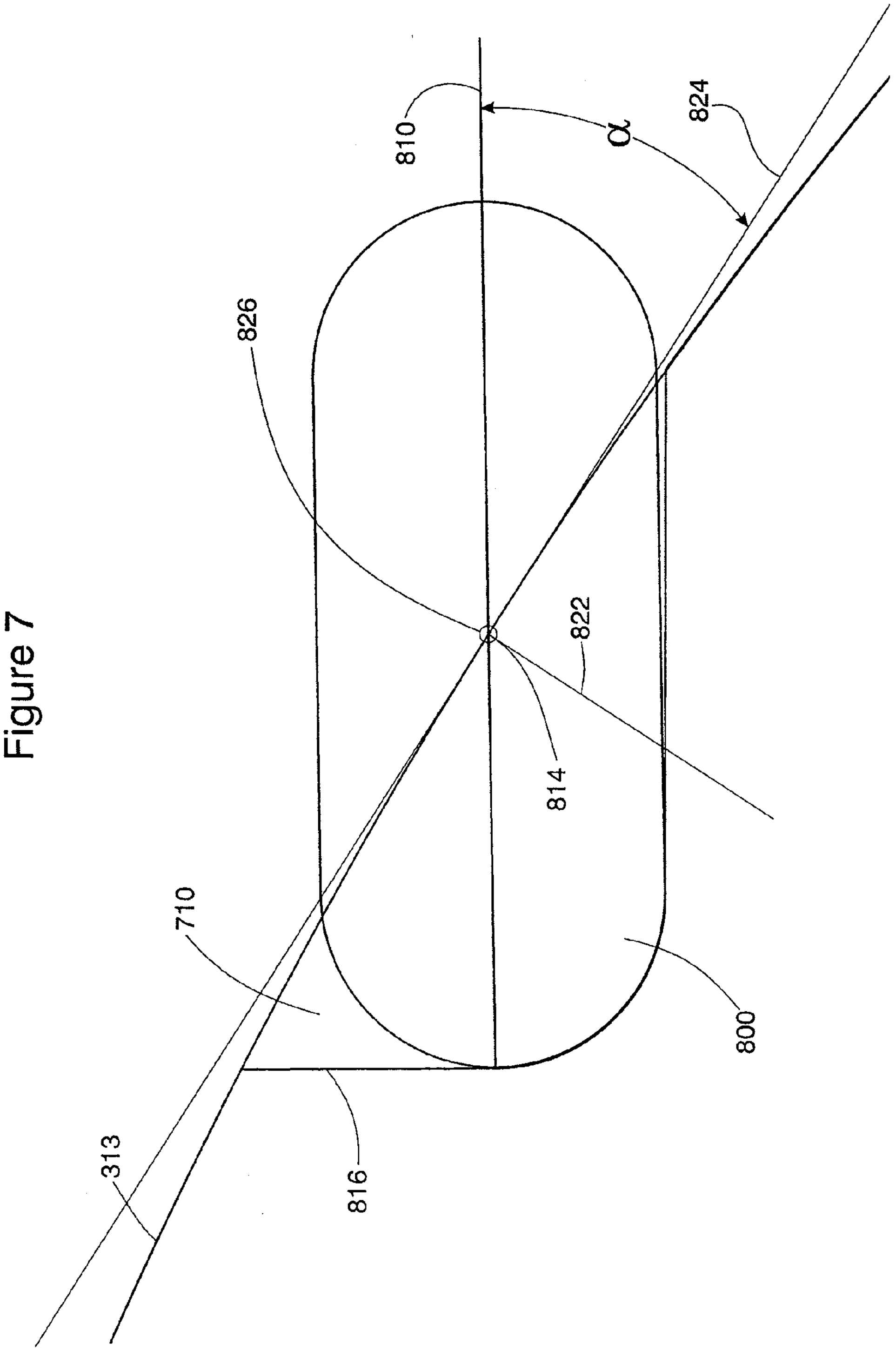
FIG. 7 is a plan drawing which further illustrates the orientation of a slot relative to a pill in the system illustrated in FIG. 1.

An exemplary embodiment of the orientation of slot 710 relative to pill 800 and the outer surface 313 of wheel 302 will now be described with reference to FIG. 7, which is an illustration of pill 800 in slot 710. In FIG. 7, line 824 is tangent to surface 313 at point of tangency 826 which corresponds with point 814. Line 822 is a radius of surface 313 to the point of tangency. Tangent line 824 is perpendicular to radius 822 at point of tangency 826. Longitudinal axis 810 of pill 800 is skewed from tangent line 824 at the point of tangency 826. Angle a is the angle between axis 810 of pill 800 and tangent line 824. In an exemplary embodiment, angle a may be 180. In an alternative embodiment, angle a may be within a range between 5 degrees and 45 degrees. Referring back to FIG. 5A, as wheel 302 rotates, slot 700 and pill 800 may move sequentially from Exemplary Position 3 to Exemplary Position 4. As long as a sufficient suction force (described in detail below) is exerted on pill 800, pill 800 may maintain the same skewed angle as pill 800 moves from Exemplary Position 3 to Exemplary Position 4.

Referring back to FIG. 5, it is seen that an exemplary embodiment of wheel 302 may have a plurality of slots. 710, each of which may hold a pill 800 and that each pill may be oriented in the same way with respect to wheel 302.

Referring back to FIG. 1, wheel 402 has an inside wall 406 and an outside wall 408. Inside wall 406 traverses the entire length of wheel 402. Outside wall 408 may comprise a series of sections. In one embodiment, a first section 410 may comprise a section that is not interrupted by apertures or slots. A second section 412 may comprise a plurality of slots to be described below. A third section 414 may comprise another section that is not interrupted by slots. In an exemplary embodiment, second end 416 of wheel 402 may include the same type of attachment structure that is coupled to second end 316 of wheel 302 and that is illustrated in FIG. 5.

The plurality of slots in wheel 402 are illustrated in FIG. 1 as arranged in a single circumferential row 428A about outside wall 408. In an alternative embodiment, section 412 may be similar to section 212 of wheel 202, having a plurality of circumferential rows of slots. In such an alternative embodiment, the widths of sections 410 and 414 may be the same as the widths of sections 210 and 214 of wheel 202. Similarly, the width of an alternative embodiment of section 412 may be the same as the width of section 212 of wheel 202. In such an alternative embodiment, the number of circumferential rows of slots in section 412 of wheel 402 may be the same as the number of circumferential rows of slots in section 212 of wheel 202.

In an exemplary embodiment of wheel 402, each slot in circumferential row 428A may have the same shape. In the alternative embodiment of wheel 402 wherein there are a plurality of circumferential rows of slots, each slot in all of the circumferential rows may also have the same shape. In another alternative embodiment, slots in different circumferential rows may have shapes that are different from slots in other circumferential rows. If the shapes of the slots are different, slots in different rows may be able to process pills that have different shapes or sizes. In an exemplary embodiment, a single slot may receive only a single pill.

Each of the slots in wheel 402 may be formed in the same way and with the same orientation as has been described with respect to the slots in wheel 302. Accordingly, FIGS. 4, 4A, 5, 5A, 6-9 and the descriptions of those figures are incorporated by reference.

Referring to FIG. 1, in an exemplary embodiment, the diameters of wheels 202, 302, and 402 may be the same. In an alternative embodiment, the diameters may be different. Also in an exemplary embodiment, the lengths of each wheel may be the same. In an alternative embodiment, the lengths of the wheels may be different. Still further in an exemplary embodiment, wheels 202, 302, and 402 may be aligned vertically with respect to one another. In an alternative embodiment, the wheels may be aligned in a different configuration, such as side-by-side. When the wheels are aligned in a vertical configuration, the distance between wheel 202 and wheel 302 may be about 0.0394 inches and the distance between wheel 302 and wheel 402 may be about 0.0394 inches.

Still referring to FIG. 1, in an exemplary embodiment, the number of circumferential rows of slots in each wheel may be the same. In an alternative embodiment, the number of circumferential rows of slots may be different. Regardless of the number of circumferential rows that are present in any of the wheels, at least one circumferential row in wheel 202 should be aligned with at least one circumferential row in wheel 302 and at least one circumferential row in wheel 302 should be aligned with at least one circumferential row in wheel 402. In the exemplary embodiment, the one circumferential row in wheel 202, the one circumferential row in wheel 302, and the one circumferential row in wheel 402 should all be aligned so as to allow one or more pills to be transferred, for example, from slots in exemplary row 228A to slots in exemplary row 328A, and from slots in exemplary row 328A to slots in exemplary row 428A as the wheels rotate. The method of transferring pills from row to row in successive wheels will be described in detail below.

In an alternative embodiment, more than one circumferential row in wheel 202 may be aligned respectively with more than one circumferential row in wheel 302, and more than one circumferential row in wheel 302 may be aligned respectively with more than one circumferential row in wheel 402. In the embodiment where each wheel has a plurality of circumferential rows, there should a one-to-one correspondence between circumferential rows in wheels 202, 302, and 402. For example, exemplary circumferential row 228B may be aligned with an exemplary hypothetical row 328B and with an exemplary hypothetical row 428B as the wheels rotate. When comparable circumferential rows in all three wheels are aligned, pills may be transferred from wheel 202 to wheel 302 and from wheel 302 to wheel 402 in all circumferential rows that are vertically aligned.

As seen in FIG. 1, pills may be dispensed from a hopper (not shown) to a dispenser apparatus 10 which may have an orientation device for properly orienting pills so that they may be inserted into the slots of wheel 202 as wheel 202 is rotating. After pills are inserted into the slots of wheel 202, the pills may be progressively transferred from wheel 202 to wheel 302 and from wheel 302 to wheel 402 so that each pill may be imaged, and therefore inspected, by the various cameras. The overall inspection process will now be explained by tracing the movement of an exemplary pill by reference to FIG. 4.

Figure 8:
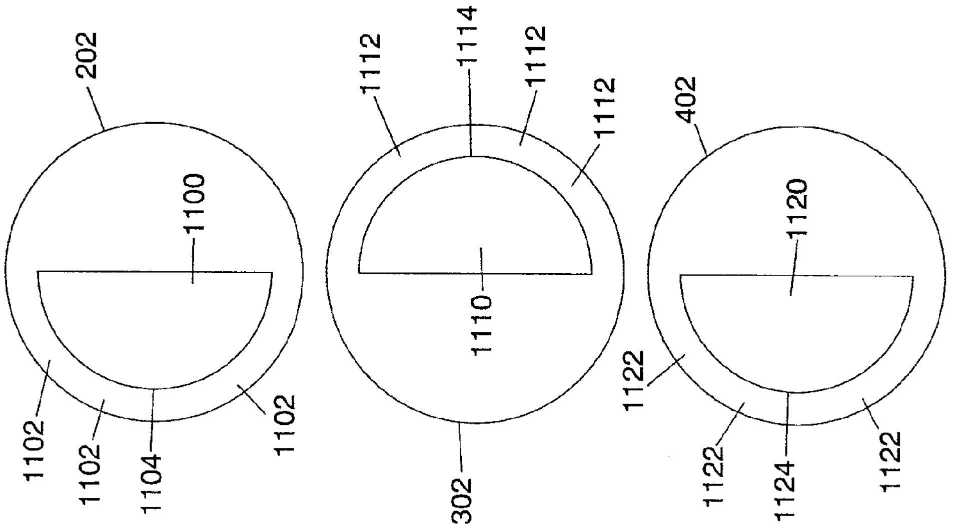
FIGS. 8, 8A, 8B, 8C and 8D illustrate the mechanics of how a pill is transferred within the system illustrated in FIG. 1.

Referring to FIGS. 4 and 4A, counterclockwise rotating wheel 202 may be holding pill 800 in a slot 700 after receiving pill from the dispenser apparatus. After pill 800 is received in slot 700 at a position that is not shown in FIGS. 4 and 4A, pill 800 and its receiving slot 700 may both rotate in a counterclockwise direction as wheel 202 rotates in a counterclockwise direction. After wheel 202, with pill 800 in slot 700 has rotated through a portion of a 360° arc, pill 800 and slot 700 may be located at exemplary position 2000. As wheel 202 continues to rotate counterclockwise, pill 800 in slot 700 may be moved from exemplary position 2000 to exemplary position 2050, and then to exemplary positions 2100 and 2150. As wheel 202 continues to rotate in a counterclockwise direction, pill 800 in slot 700 may reach a location where pill 800 may be transferred to slot 710 at exemplary position 3200 in wheel 302 that may be rotating in a clockwise direction as indicated by arrow 350. FIGS. 8-8D more clearly explains the mechanics of how pill 800 may be transferred from slot 700 on wheel 202 to slot 710 on wheel 302 in or about the vicinity of exemplary position 3200. Slot 710 is shown at exemplary position 3050 on wheel 302 in FIGS. 4 and 4A. It will be understood by those of ordinary skill in the art, that the exemplary positions indicated in FIGS. 4 and 4A are used only to illustrate how pill 800 may rotate and how it may be transferred from one wheel to another wheel. It will be understood that other exemplary positions may be used for illustrative purposes, and that more or fewer exemplary positions could be illustrated. It will also be understood that pill 800 moves in a continuous motion along with the wheel that is holding it and that the exemplary positions have been selected from an infinite number of positions that could have been selected in order to illustrate the motion(s) and transfer(s) of pill 800.

After pill 800 is transferred to slot 710 on wheel 302, pill 800 and slot 710 may rotate in a clockwise direction as wheel 302 rotates in a clockwise direction. Accordingly, pill 800 and slot 710 may rotate from exemplary position 3200 to exemplary position 3250, and then to exemplary positions 3300,

3350, 3400, 3450, 3500, 3550, 3600, 3650, 3700, 3750, 3800, and 3850. As wheel 302 continues to rotate in a clockwise direction, pill 800 in slot 710 may be transferred to a slot 720 at exemplary position 4000 in wheel 402 (see FIGS. 4, 5) that may be rotating in a counterclockwise direction as indicated by arrow 450.

After pill 800 is transferred to slot 720 on wheel 402, pill 800 and slot 720 may rotate in a counterclockwise direction as wheel 402 rotates in a counterclockwise direction. Accordingly, pill 800 and slot 720 may rotate from exemplary position 4000 to exemplary position 4050, and then to exemplary positions 4100, 4150, 4200, 4250, 4300, and 4350.

FIG. 8 is a cross-section view of wheels 202, 302, and 402. For example, FIG. 8 illustrates a cross-section view of wheel 202 taken along line 8-8 in FIG. 1. FIG. 8 also illustrates an analogous cross-section view of wheels 302 and 402. As described above, each of the wheels has circumferential rows of slots (not shown in FIG. 8) whose walls may be made from a mesh material or which may have holes in them, also as described above. Inside wheel 202 is an apparatus 1100 for creating a vacuum around approximately a 180° arc on one side of wheel 202. The material from which the arc portion 1104 is made may be a mesh or may have one or more holes in it. As illustrated in FIG. 8, in an exemplary embodiment, the 1800 arc portion may be about the left half of wheel 202. In an alternative embodiment, a vacuum may be created around more or less than a 180° arc of wheel 202 and the 180° arc portion 1104 may be about a different part of wheel 202. The vacuum created by apparatus 1100 may create a suction force in the direction of arrows 1102 against the pills that are positioned in the slots around the circumference of wheel 202. Depending upon the rotational position of a specific pill as the pill is rotated by wheel 202, the suction force may be sufficient to keep each pill from falling out of its respective slot.

Inside of wheel 302 is an apparatus 1110 for creating a vacuum around approximately a 180° arc on one side of wheel 302. As illustrated in FIG. 8, in an exemplary embodiment, a 180° arc portion 1114 may be about the right half of wheel 302. The material from which the arc portion 1114 is made may be a mesh or may have one or more holes in it. In an alternative embodiment, a vacuum may be created around more or less than a 180° arc of wheel 302 and the 180° arc portion may be about a different part of wheel 302. The vacuum created by apparatus 1110 may create a suction force in the direction of arrows 1112 against the pills that are positioned in the slots around the circumference of wheel 302. Depending upon the rotational position of a specific pill as the pill is rotated by wheel 302, the suction force may be sufficient to keep each pill from falling out of its respective slot. As illustrated in FIG. 8, apparatus 1110 may create a suction force on the right half of wheel 302 while apparatus 1100 may create a suction force on the left half of wheel 202.

Inside of wheel 402 is an apparatus 1120 for creating a vacuum around approximately a 180° arc on one side of wheel 402. As illustrated in FIG. 8, in an exemplary embodiment, a 180° arc portion 1124 may be about the left half of wheel 402. The material from which the arc portion 1124 is made may be a mesh or may have one or more holes in it. In an alternative embodiment, a vacuum may be created around more or less than a 180° arc of wheel 402 and the 180° arc portion 1124 may be about a different part of wheel 402. The vacuum created by apparatus 1120 may create a suction force in the direction of arrows 1122 against the pills that are positioned in the slots around the circumference of wheel 402. Depending upon the rotational position of a specific pill as the pill is rotated by wheel 402, the suction force may be sufficient to keep each pill from falling out of its respective slot. As illustrated in FIG. 8, apparatus 1120 may create a suction force on the left half of wheel 402.

Figure 9:
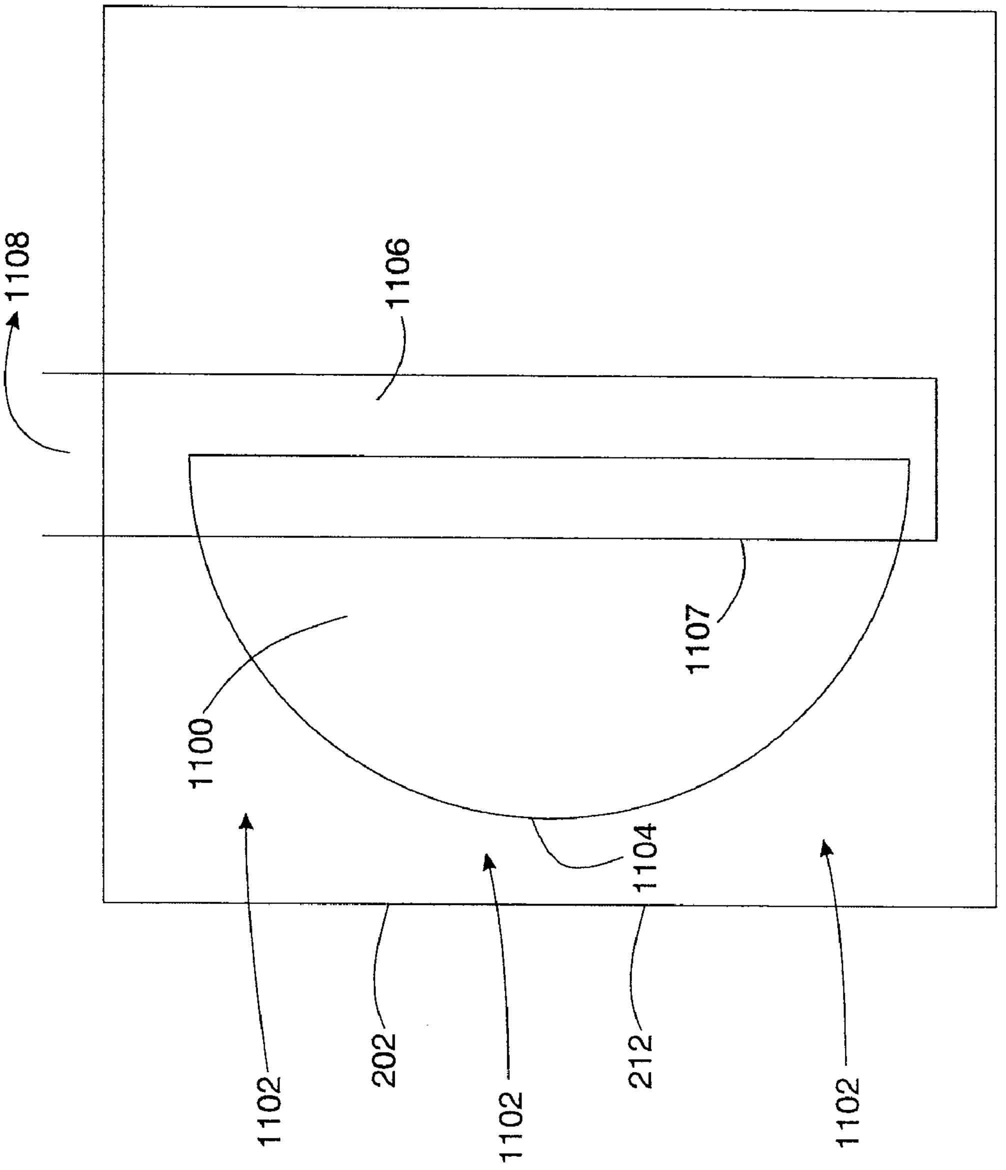
FIG. 9 is a top cross section view of a wheel from the system shown in FIG. 1.

FIG. 9 is a top cross-section view of wheel 202 taken along line 9-9 in FIG. 1. FIG. 9 shows wheel 202. It will be understood that section 212 may have a circumferential row of slots (not shown) with pills (not shown) in them. FIG. 9 also shows exemplary vacuum apparatus 1100 inside wheel 202 with its side 1104 facing the slots and pills in the corresponding portion of section 212. Vacuum apparatus 1100 may exert suction forces in the direction of arrows 1102 on the pills. Vacuum apparatus 1100 may be mounted onto wheel 202 by a hollow cylindrical rod 1106 which may be coupled to a vacuum source to produce suction 1108. Wall portion 1107 of rod 1106 may have one or more holes in it in order to transmit suction forces 1102 through an opening or openings in side 1104. Although not illustrated, similar devices may couple vacuum apparatuses 1110 and 1120 to one or more additional vacuum sources for wheels 302 and 402.

Figure 8A:
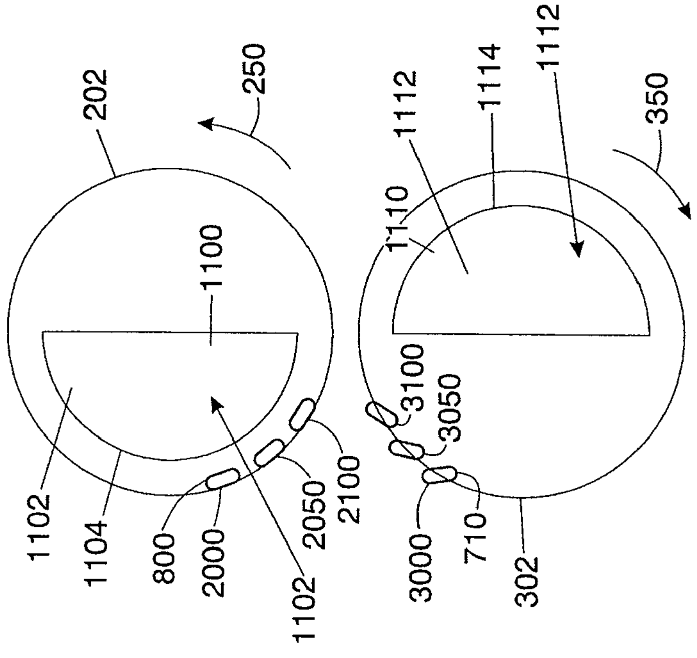

FIG. 8A is a more detailed illustration of the relationship between the movement of a pill in wheel 202 and its transfer to wheel 302. FIG. 8A illustrates an exemplary pill 800 moving from exemplary position 2000 to exemplary position 2050 and from exemplary position 2050 to exemplary position 2100 as wheel 202 rotates in a counterclockwise direction indicated by arrow 250. It should be understood that, for purposes of this illustration in order to simplify the explanation, it has been assumed that only one pill is positioned in wheel 202 and that it is moving sequentially through these positions. In an alternative embodiment, a plurality of pills may be moving sequentially through these positions. While pill 800 is rotating with wheel 202, pill 800 may be held within the confines of its respective slot 700 by suction forces 1102 produced by vacuum 1100. Suction forces 1102 may therefore restrain pill 800 from falling out of slot 700 due to gravity as pill 800 is moved through these exemplary positions. Suction forces 1102 may operate on pill 800 only as long as pill 800 is adjacent side 1104 of vacuum 1100. Once pill 800 passes side 1104, pill 800 may no longer be subject to the suction forces 1102 and pill 800 may drop out of slot 700.

FIG. 8A also illustrates an exemplary empty slot 710 in wheel 302 moving from exemplary position 3000 to exemplary position 3050 and from exemplary position 3050 to exemplary position 3100 as wheel 302 rotates clockwise, indicated by arrow 350. It should be understood that, for purposes of this illustration in order to simplify the explanation, it is assumed that only one slot 710 is positioned in wheel 302 and that it is moving sequentially through these positions. In an alternative embodiment, a plurality of slots in wheel 302 may be moving sequentially through these positions. As long as pill 800 is not in slot 710 of wheel 302, there is no need for any suction forces to be applied to slot 710. Consequently, vacuum 1110 may not be applying any suction forces 1112 to slot 710 when slot 710 is in any of exemplary positions 3000, 3050 and 3100 or in any other positions on the left side of wheel 302.

Figure 8B:
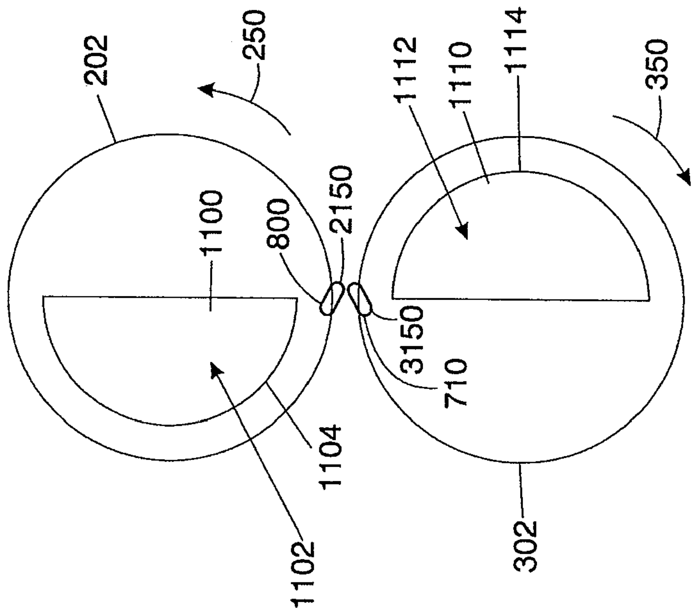
Figure 8D:
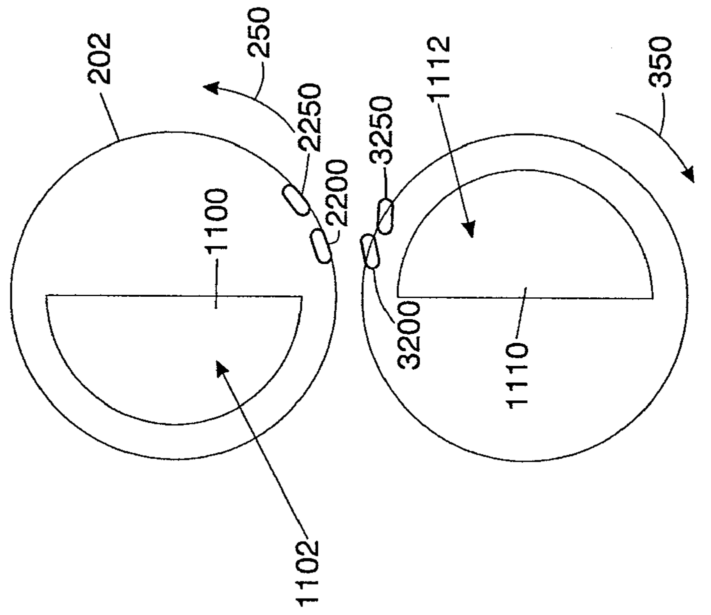

FIG. 8B illustrates how pill 800 begins the transition from wheel 202 to wheel 302. As shown in FIG. 8B, as the front part of pill 800 begins to pass side 1104 of vacuum 1100, the front part may become increasingly not subject to suction forces 1102. At the same time, as the front part of pill 800 begins to approach the part of wheel 302 that is subject to suction forces 1112, the front part of pill 800 may become increasingly subject to suction forces 1112 of vacuum 1110. In addition, as slot 710 approaches side 1114 of vacuum 1110, slot 710 may become increasingly subject to suction forces 1112. Therefore, as the front part of pill 800 becomes increasingly not subject to suction forces 1102 and concurrently becomes increasingly subject to suction forces 1112, the front part of pill 800 may begin to tilt out of slot 700 in wheel 202 toward slot 710 in wheel 302, as shown in FIG. 8B. The aforesaid movement of pill 800 may occur in the general vicinity of exemplary position 2150 in wheel 202, corresponding to exemplary position 3150 of slot 710 in wheel 302.

Figure 8C:
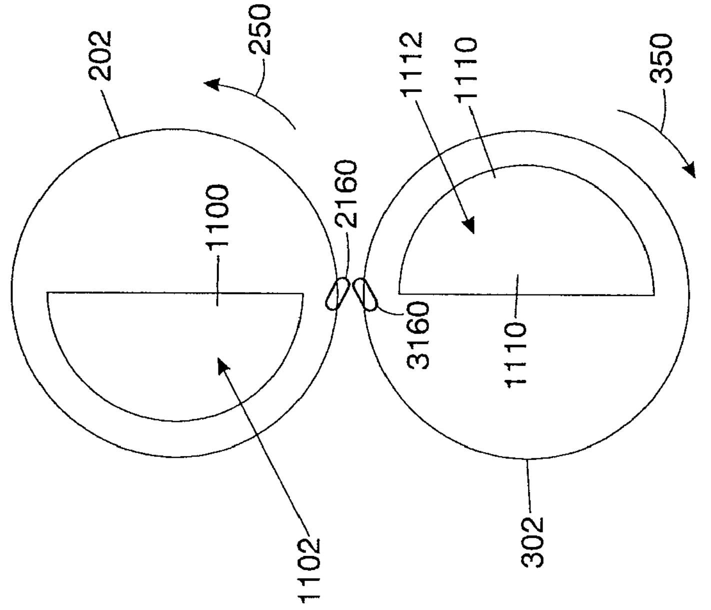

Referring to FIG. 8C, it may be seen that pill 800 may have reached exemplary position 2160, wherein the majority of pill 800 may not be subject to suction forces 1102 of vacuum 1100 in wheel 202 and may be significantly subject to suction forces 1112 of vacuum 1110 in wheel 302. At that point, in an exemplary embodiment, pill 800 may be pulled from slot 700 in wheel 202 toward slot 710 at exemplary position 3160 in wheel 302 by a combination of the forces of gravity and suction forces 1112. It will be understood, however, that in alternative embodiments, pill 800 may be pulled from slot 700 toward slot 710 at some point sooner or later than exemplary position 2160. Once pill 800 begins to move toward slot 710 in wheel 302, there should not be anything between the two wheels to prevent the transition and pill 800 may move into slot 710 of wheel 302.

Referring to FIG. 8D, pill 800 is illustrated as having completed the transfer to slot 710 at exemplary position 3200. Simultaneously, slot 700, which had 25 been holding pill 800 in wheel 202, is empty and may be at exemplary position 2200.

Therefore, slot 700 at exemplary position 2200 may no longer be subject to any suction forces 1102. Concurrently, a substantial amount of pill 800 may be positioned in slot 710 of wheel 302 and subject to suction forces 1112 at exemplary position 3200. More specifically, pill 800 may be positioned in slot 710 in the manner 30 illustrated in FIGS. 5A and 7, discussed above. Empty slot 700 in wheel 202 may continue to be rotated to exemplary position 2250 and to other subsequent circumferential positions as wheel 202 continues to rotate. Therefore, when slot 700 again reaches exemplary position 2000, or some other position in an alternative embodiment, it may receive another pill for transition to wheel 302. Similarly, as wheel 302 continues to rotate, pill 800 may rotate to exemplary position 3250 and to other positions as will explained below.

It will be understood that the movements of wheels 202 and 302 should be synchronized in some manner so that slot 700 and pill 800 reaches the end of suction forces 1102 at about the same time pill that 800 begins to be affected by the suction forces 1112. It will also be understood that the movements of slot 700 and slot 710 should be synchronized so that the slots are aligned when there is a transition of suction forces. This double synchronization may enable pill 800 to transition from slot 700 to slot 710.

Referring back to wheel 202 in FIGS. 4 and 4A, it will be understood that as one or more pills transition from exemplary positions 2000, 2050, 2100 and 2150 to wheel 302, slots past exemplary position 2200 may be empty. Accordingly, referring to FIG. 4A, exemplary slots at exemplary positions 2250, 2300, and 2350 may be empty. Referring back to wheel 302 in FIGS. 4 and 4A, it will be understood that as one or more pills are positioned in slots located in exemplary positions 3200 through 3850, for example, slots on the other side of wheel 302 may be empty. For example, exemplary slots 3910, 3920, 3930, 3940, 3000, 3050, 3100, 3150 and all slots between exemplary slots 3000 and 3940 may be empty. As wheel 302 continues to rotate, these empty slots may become aligned with respective slots in wheel 202, receive respective pills from wheel 202, and continue to rotate until the pills in wheel 302 are transitioned from slots in wheel 302 to slots in wheel 402 in the same manner that pills transitioned from wheel 202 to wheel 302.

In an exemplary embodiment, cameras 502 and 602 may be coupled to an image recognition system which may determine if any aspect of the shape of the pills being imaged by cameras 502 and 602 deviates from an expected shape. In an alternative embodiment, infrared detector systems may be used to determine if the shape of pills varies from an expected shape. In another alternative embodiment, one or more lasers may be used to determine if the shape or size of each pill varies from an expected shape or size.

Some of the reasons why pill 800 may be transferred from wheel 202 to wheel 302 and then to wheel 402 will now be explained. Still referring to FIG. 4, cameras 502 and 602 are illustrated as being positioned on one side of the wheels while cameras 902 and 1002 are illustrated as being positioned on a second side of the wheels. Cameras 502 and 602 may both be pointed toward pill 800 while it is positioned in wheel 302 and cameras 902 and 1002 may both be pointed toward pill 800 while it is positioned in wheel 402. It will be understood by those of ordinary skill in the art that the particular positions of the cameras on the respective sides of the wheels may be changed within the scope of the invention, that more or fewer cameras may be used on each side of the wheels, that any particular camera may point to a different wheel than is illustrated in FIG. 4. and that any particular camera may be pointed at a different angle with respect to a wheel than is illustrated in FIG. 4.

When pill 800 is transferred to slot 710 in wheel 302, its side 802 may be exposed so that it may be viewed by camera 500 and its end 806 may be exposed so that it may be viewed by camera 602. The exposure of side 802 and end 806 may be imaged, for example, when pill 800 is located at exemplary position 3400. On the other hand, when pill 800 is located in wheel 302, side 804 and end 808 of pill 800 may not be exposed to the view of either camera because side 804 is positioned against a side of slot 710 end 808 may be positioned against an end wall of slot 710 as seen, for example at exemplary position 3400. As a result, of the aforesaid orientation of pill 800 in slot 710, camera 502 may also view side 802 of pill 800 when pill 800 is in exemplary position 3450 and camera 602 may view end 806 of pill 800 when pill 800 is in exemplary position 3550. It will be understood that camera 502 may view side 802 when pill 800 is in a position other than exemplary positions 340 or 3550 and that camera 602 may view end 806 when pill 800 is in a position other than exemplary positions 3400 or 3550.

When pill 800 is transferred to from wheel 302 to wheel 402, side 802 may no longer be exposed to view because it may be positioned against a side of slot 720. Similarly, end 806 may no longer be exposed to view because it may be positioned against an end wall of slot 720. Instead, as pill 800 rotates in a counterclockwise direction in wheel 402, end 808 may be exposed to the view of camera 902 when pill 800 is at located at exemplary position 4350 and side 804 may be exposed to camera 1002 when pill 800 is located at exemplary position 4300. It will be understood that camera 902 may view end 808 when pill 800 is in a position other than exemplary position 4350 and that camera 1002 may view side 804 when pill 800 is in a position other than exemplary position 4300.

Although the invention is illustrated and described herein with reference to specific embodiments, the invention is not intended to be limited to the details shown. Rather, various modifications may be made in the details within the scope and range of equivalents of the claims and without departing from the invention.

For example, the invention may use only a single wheel such as wheel 202; or it may use only a single wheel such as wheel 302. In another alternative embodiment, the invention may use a wheel such as wheel 202 in combination with a wheel such as wheel 302. In yet another alternative embodiment, wheel 202 may be used in combination with a wheel such as wheel 302 that has a plurality of circumferential rows of apertures instead of the single row illustrated in FIG. 1

What is claimed:

1. An apparatus for orienting a pill, the apparatus comprising:

a curved member having a point of tangency at which the pill is positioned on the curved member; and a portion for positioning the pill skewed from a tangent at the point of tangency, the portion for positioning the pill is an aperture in the curved member, the aperture is in a surface of the curved member and a portion of the pill is disposed within the aperture, wherein another portion of the pill protrudes from the aperture beyond the surface of the curved member.

2. The apparatus of claim 1, wherein the curved member is rotatable.

3. The apparatus of claim 1, further comprising an attachment structure for attaching the curved member to a source of motion.

4. An apparatus for orienting a pill, the apparatus comprising:

a first curved member having a first point of tangency at which the pill is positioned on the first curved member and a first portion for positioning the pill skewed from a first tangent at the first point of tangency; and a second curved member positioned adjacent the first curved member, the second curved member having a second point of tangency at which the pill is adapted to be positioned on the second curved member and a second portion for positioning the pill skewed from a second tangent at the second point of tangency.

5. The apparatus of claim 4, wherein the first portion is a first aperture in the first curved member and the second portion is a second aperture in the second curved member.

6. The apparatus of claim 5, wherein the first aperture is in a surface of the first curved member and the second aperture is in a surface of the second curved member.

7. The apparatus of claim 6, wherein the first curved member and the second curved member are each rotatable.

8. The apparatus of claim 7, further comprising a first attachment structure for attaching the first curved member to a first source of motion and a second attachment structure for attaching the second curved member to a second source of motion.

9. The apparatus of claim 5, wherein the first curved member and the second curved member are operable to transfer the pill from the first aperture to the second aperture.

10. A method of orienting a pill in a first curved member having a first point of tangency at which the pill is positioned on the first curved member and a first portion for positioning the pill skewed from a first tangent at the first point of tangency and a second curved member having a second point of tangency at which the pill is positioned on the second curved member and a second portion for positioning the pill skewed from a second tangent at the second point of tangency, the method comprising:

positioning the pill at the first point of tangency skewed from the first tangent; and transferring the pill to the second curved member skewed from the second tangent.

11. The method of claim 10, further comprising:

after positioning the pill at the first point of tangency, rotating the first curved member and rotating the second curved member; and positioning the first point of tangency of the first curved member adjacent the second point of tangency of the second curved member.

12. Apparatus for orienting a pill, said apparatus comprising:

a first curved member for rotating said pill and for orienting said pill so that a first portion of said pill is visible;

a second curved member for receiving said pill from said first curved member, for rotating said pill and for orienting said pill so that a second portion of said pill different than said first portion is visible.

13. Apparatus for orienting a pill according to claim 12, further comprising imaging apparatus for imaging said first and second portions of said pill.

* * * * *